United States Patent [19]

Nambu

[11] Patent Number: 4,597,343
[45] Date of Patent: Jul. 1, 1986

[54] CONTINUOUS PAPER-TUBE POTTED-SEEDLINGS SEPARATION TRANSPLANTING PLANTING MACHINE

[75] Inventor: Tetsuo Nambu, Obihiro, Japan

[73] Assignee: Nippon Tensaiseito Kabushiki Kaisha, Tokyo, Japan

[21] Appl. No.: 463,839

[22] Filed: Feb. 4, 1983

[30] Foreign Application Priority Data

Feb. 9, 1982 [JP] Japan ................................ 57-18279
Jun. 7, 1982 [JP] Japan ................................ 57-96195

[51] Int. Cl.$^4$ ............................................. A01C 11/02
[52] U.S. Cl. ........................................ 111/2; 225/106; 111/3
[58] Field of Search ............... 111/2, 3; 414/224, 226; 901/6; 225/106

[56] References Cited

U.S. PATENT DOCUMENTS

| | | | |
|---|---|---|---|
| 3,923,332 | 12/1975 | Shirouzu | 111/2 X |
| 4,106,415 | 8/1978 | Häkli | 111/3 |
| 4,130,072 | 12/1978 | Dedolph | 111/2 |
| 4,132,337 | 1/1979 | Masuda et al. | 225/5 |
| 4,167,911 | 9/1979 | Masuda et al. | 225/5 |
| 4,289,090 | 9/1981 | Penley | 111/3 |
| 4,307,827 | 12/1981 | Turunen | 111/2 X |
| 4,341,333 | 7/1982 | Boa | 111/2 |
| 4,404,917 | 9/1983 | Häkli | 111/3 |

FOREIGN PATENT DOCUMENTS

| | | | |
|---|---|---|---|
| 849197 | 4/1937 | Fed. Rep. of Germany | 111/3 |
| 2245016 | 4/1974 | Fed. Rep. of Germany | 225/106 |

*Primary Examiner*—Robert A. Hafer
*Assistant Examiner*—Danton DeMille
*Attorney, Agent, or Firm*—Parkhurst & Oliff

[57] ABSTRACT

A transplanting machine having rotary transplanting rods which clasp the forwardmost one of a row of continuous potted seedlings of a continuous paper tube pot assembly of potted seedlings so as to draw out the row of continuous potted seedlings. Further, the rotary transplanting rods separate the forwardmost one from the row of continuous potted seedlings in cooperation with a stopping mechanism for stopping such drawing out, and plant the separated potted seedling in the field while clasping it.

10 Claims, 16 Drawing Figures

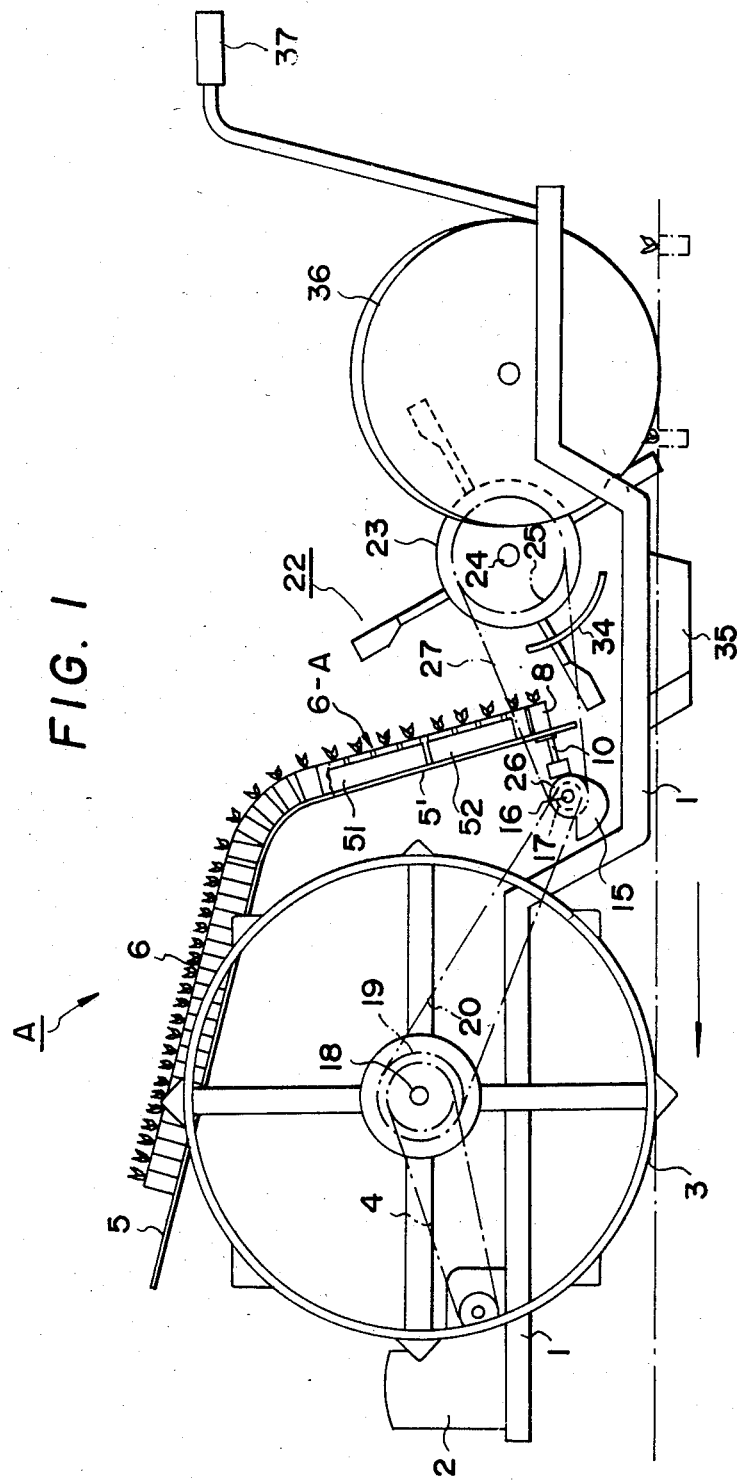

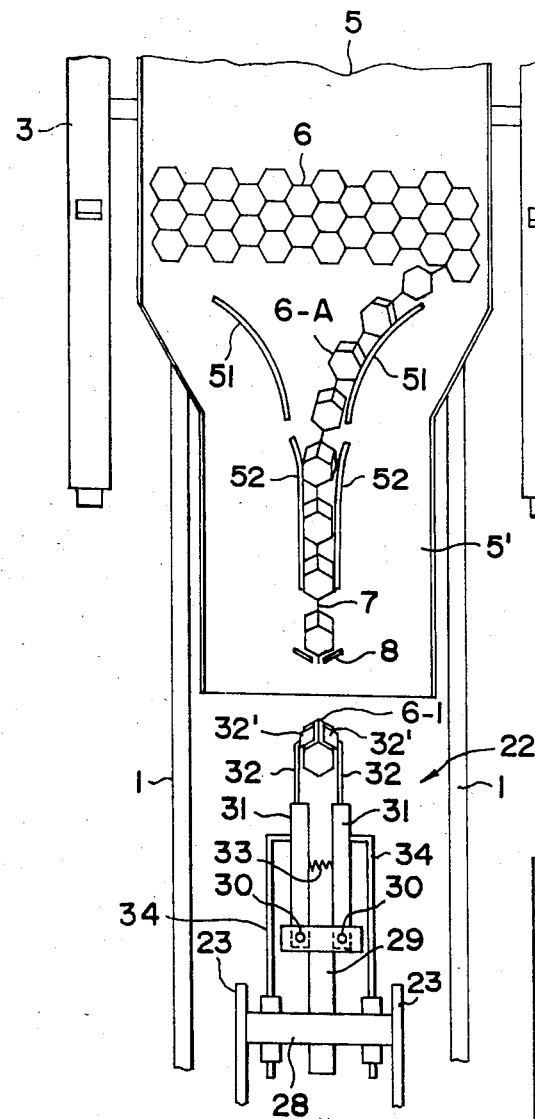
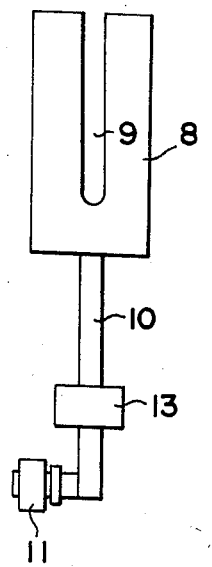
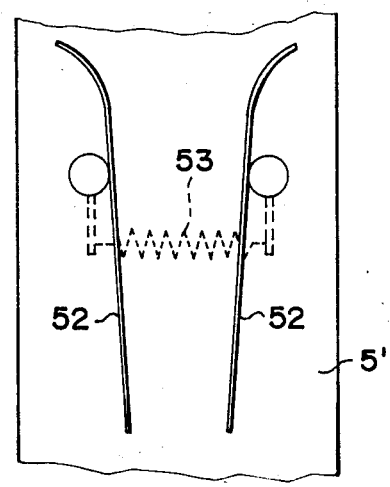

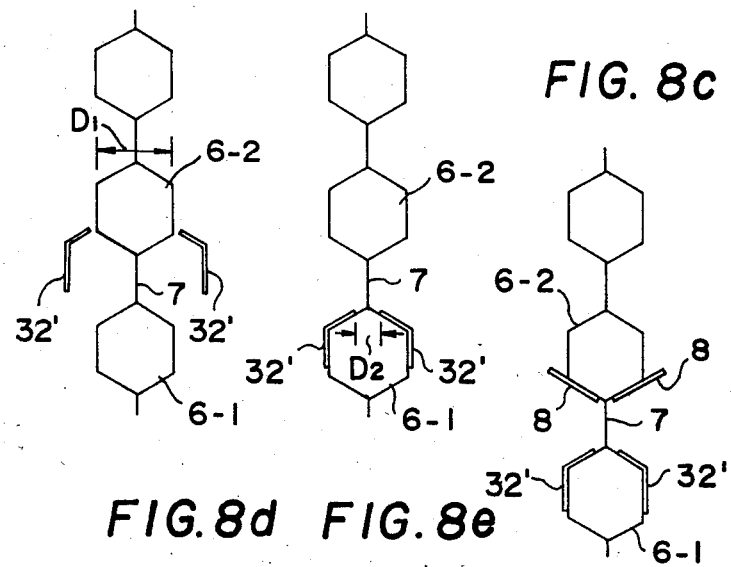
FIG. 8a  FIG. 8b  FIG. 8c
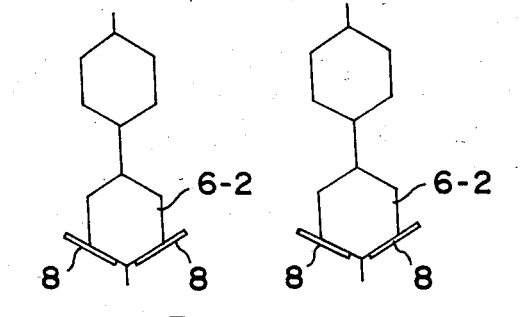
FIG. 8d  FIG. 8e
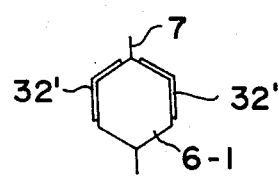
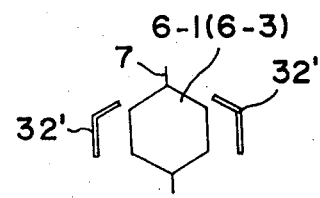

CONTINUOUS PAPER-TUBE POTTED-SEEDLINGS SEPARATION TRANSPLANTING PLANTING MACHINE

BACKGROUND OF THE INVENTION

1. Field of the Invention

The present invention relates to a transplanting machine for drawing out, in a form of a row, potted seedlings grown in a continouous paper tube pot assembly and successively separating the row of potted seedlings into individual ones so as to successively plant the separated individual potted seedlings in a given field.

2. Description of Prior Art

It has been known to grow seedlings of plants such as beets, vegetables, or other garden products in a continuous paper tube pot assembly, to separate the continuous paper tube potted seedlings into individual potted seedlings, and to plant the separated individual potted seedlings in a given field. Here, the term "continuous paper tube pot assembly" is defined as a plurality of paper tube pots connected in series one after another in the form of a train and folded into a compact assembly.

A typical example of a continuous paper tube pot assembly is one developed by the present inventor in which a plurality of paper tube pots is connected in series through connecting portions, each of which is provided with a separation guide portion including a slit. Seedlings are grown in the continuous paper tube pot assembly and, in planting, the continuous paper tube pots are successively drawn out in the form of a row, and the drawn-out row of continuous potted seedlings is successively separated into individual potted seedlings which are successively planted in a given field.

A transplanting machine suitable for the above-mentioned planting of continuous paper tube potted seedlings is disclosed in such as Japanese Patent Publication No. Sho 55-30805 (1980) and Japanese Utility Model Publication No. Sho 55-39700 (1980).

In such a conventional transplanting machine, the continuous paper tube potted seedlings are drawn out in the form of a row by a pair of rollers or a belt. The drawn-out row of potted seedlings is successively separated into individual paper tube potted seedlings by a pair of elastic, slantingly provided rollers or conical rollers rotated at a large peripheral speed which are positioned forward of the drawn-out row of potted seedlings, as a result of the speed difference between the first mentioned rollers or belt and the second mentioned rollers. After the separation, the individual paper tube potted seedlings are successively dropped through a chute into a previously formed groove and buried therein.

The above-mentioned transplanting machine provides very good transplanting when it is used for planting seedlings grown in elongated or slender paper tube pots, such as potted beet seedlings (usually grown in paper tube pots each having an inlet dimension of 1.9 cm and a height of about 10–13 cm), potted corn seedlings (usually grown in pots each having an inlet dimension of 3 cm and a height of 10 cm). However, the conventional transplanting machine has the drawback that is is difficult to form a proper slit at the above-mentioned separation guide portion. This results in a risk of faulty separation when the transplanting machine is used for transplanting potted seedlings grown in paper tube pots each having a large inner dimension relative to its height, such as potted vegetable seedlings (usually grown in paper tube pots each having an inlet dimension of about 3–5 cm and a height of about 5–7.5 cm).

The conventional transplanting machine has a further drawback in that it is necessary to clasp the potted seedling row by applying considerably strong pressing force to the opposite sides of the row in separating the potted seedlings, resulting in collapse of the soil about the root in each pot.

The conventional transplanting machine has a still further drawback in that since the separated individual potted seedlings are made to fall through a chute during planting, each potted seedling may be inverted in the chute because of the low height, thereby spoiling the planting.

SUMMARY OF THE INVENTION

As a result of research to overcome the above-mentioned drawbacks in the conventional transplanting machine, the present inventor has found that potted seedlings grown in a continuous paper tube pot assembly (each pot having any desired shape) can be surely planted by a forcible planting method, in place of the above-mentioned chute-falling method, comprising the following steps during the process from clasping of the potted seedlings by a transplanting rod assembly to planting in a given field: drawing out a row of paper tube potted seedlings in conjunction with the rotation of the transplanting rod assembly, stopping the potted seedling row at a predetermined position, successively separating the row of potted seedlings into individual ones, and successively planting the separated individual potted seedlings. The present invention has been developed as a result of this discovery by the inventor.

An object of the present invention is to provide a transplanting machine by which continuous paper tube potted seedlings can be surely and accurately separated into individual paper tube potted seedlings, regardless of the inlet dimension of each paper tube pot, and the separated individual paper tube potted seedlings can be surely and accurately planted in a given field.

To attain this object, according to the present invention, continuous paper tube potted seedlings are drawn out in the form of a row by utilizing the rotary force of a rotary transplanting rod assembly which clasps the forwardmost one of the row of paper tube potted seedlings, the forwardmost potted seedling is separated from the drawn-out potted seedling row by the rotary transplanting rod assembly in cooperation with a stopper mechanism for stopping the drawing out of the succeeding paper tube potted seedlings, and, as the transplanting rod assembly further rotates, the separated paper tube potted seedlings are released onto the ground by the rotary transplanting rod assembly and planted there.

BRIEF DESCRIPTION OF THE DRAWINGS

FIG. 1 is a schematic side view of an embodiment of the transplanting machine according to the present invention;

FIG. 2 is a plan view of the main portion of the transplanting machine of FIG. 1;

FIG. 4 is a detailed front view of stopping plate;

FIG. 5 is a detailed plan view of pressing plates;

FIGS. 8a to 8e are diagrams for explaining the steps of separation;

DESCRIPTION OF PREFERRED EMBODIMENTS

Figure 3:
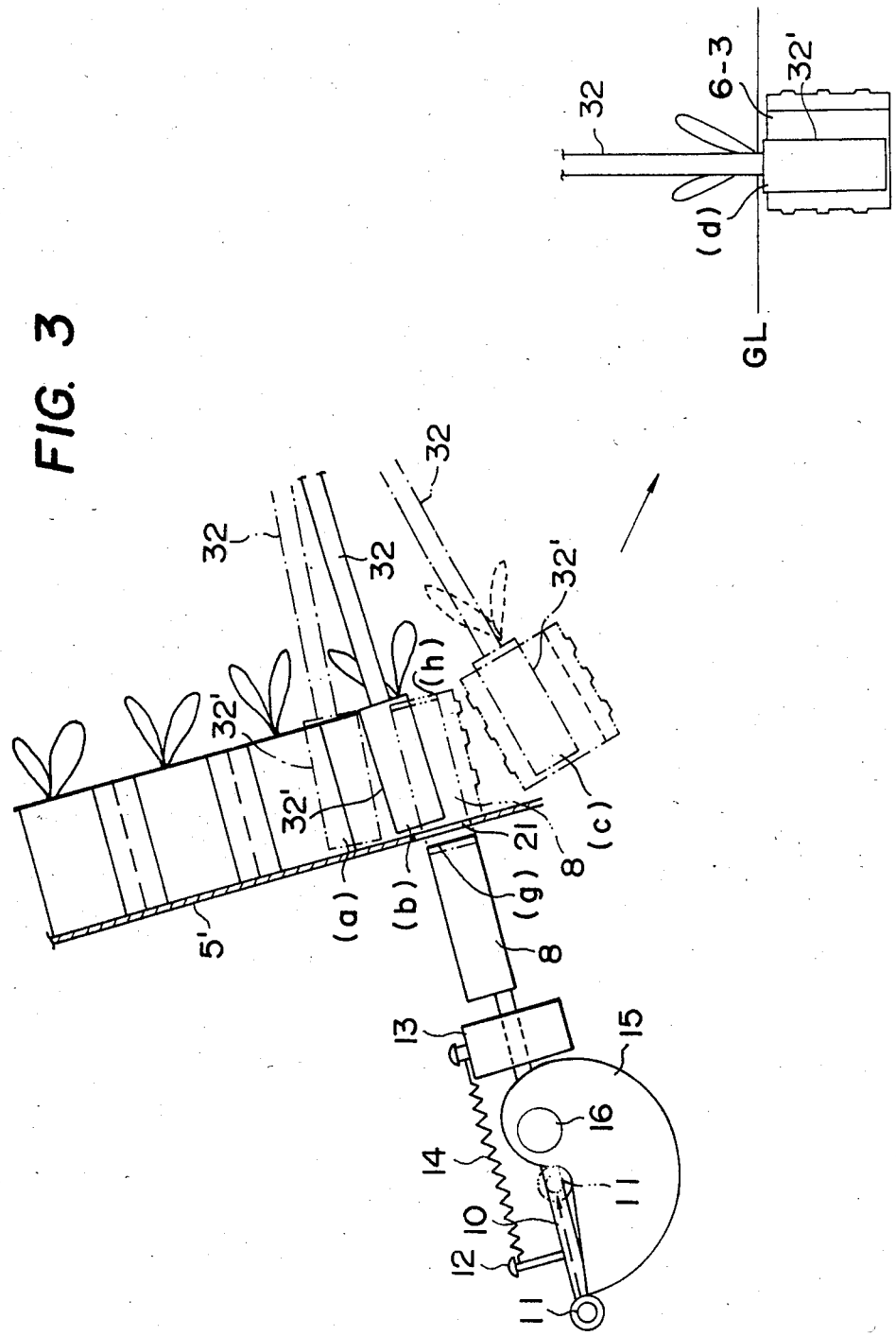
FIG. 3 is a side view illustrating the separation of the forwardmost one from a row of continuous paper tube potted seedlings.

Preferred embodiments of the present invention will be described in conjunction with the appended drawings. However, it is to be understood that the description is by way of example only, and further modifications and embodiments hereof are not excluded hereby from the scope of protection under the appended claims.

An engine 2 is mounted at the forward end portion of a frame 1 of a transplanting machine and wheels 3, 3, are provided on frame 1. The wheels 3, 3 are driven by the engine 2 through a chain 4 so as to advance the machine in the direction as shown by the arrow.

A seedling table 5 is fixed on the frame 1 so as to mount thereon continuous paper tube pot assembly potted seedlings 6. The seedling table 5 has a steep inclined plane portion toward the direction opposite to the advancing direction of the machine, the steep inclined plane portion constituting a draw-out portion 5' through which a row of continuous paper tube potted seedlings 6-A is drawn out of the continuous paper tube assembly potted seedlings 6. Thus, on the draw-out portion 5', the drawn out row of continuous paper tube potted seedlings 6-A fall down along the steep inclined plane with the top surface of the seedlings sideways. A pair of guide plates 51 for guiding the row of continuous paper tube potted seedlings 6-A is provided at a central portion of the seedling table 5 or the draw-out portion 5' so as to help in the drawing out of the potted seedlings 6-A. At the respective forward end portions of the guide plates 51, 51 are provided a pair of pressing plates 52, 52 for preventing the row of continuous paper tube potted seedlings 6-A from spontaneously falling due to the steep incline. For this end, as shown in FIG. 5, the pressing plates 52, 52 are arranged such that the lower portions of the plates 52, 52 slidably abut against the draw-out portion 5' and a spring 53 is provided between the pressing plates 52, 52 out of the way of the row 6-A (as later described in detail), so as to urge the pressing plates 52, 52 inwardly, or, alternatively, each of the pressing plates 52, 52 is made of a plate spring which is always inwardly biased.

In front of the pressing plates 52, 52, a stopping plate 8 is provided opposite the forward ends of the pressing plates 52, 52 so that the stopping plate 8 may be in impact contact with the forward end of the row of continuous paper tube potted seedlings 6-A. The stopping plate 8 is made of a plate body. At the central portion of the stopping plate 8 is provided a longitudinally formed slot 9 (FIG. 4) which allows a connecting portion 7 of the row of continuous paper tube potted seedlings 6-A to pass therethrough. To the root portion of the stopping plate 8, a slide rod 10 is fixed at one end, as shown in FIG. 4. A roller 11 is slidably attached to the slide rod 10 at its other end. A pin 12 (FIG. 3) is fixed to the slide rod 10 at a portion near the roller 11. The slide rod 10 is supported at its central portion by a bearing 13 fixed to the frame 1. A spring 14 is provided between the pin 12 and the bearing 13 so as always to urge the pin 12 toward the bearing 13 (FIGS. 3 and 4). The roller 11 rotates as a cam 15 rotates. The cam 15 is in slidable contact with the roller 11 and is rotated by a chain 20 provided between a sprocket 17 fixed to a cam shaft 16 and another sprocket 19 fixed to a shaft 18 of the wheels 3, 3 as seen in FIG. 1. Thus, the stopping plate 8 may move in conjunction with the wheels 3, 3 so that it appears and disappears in front of the pressing plates 52, 52, passing through an opening 21 formed in the draw-out portion 5'. Particularly, the stopping plate 8 is drawn down to stand by at the under side of the draw-out portion 5' for a predetermined time and as the cam 15 further rotates, the roller 11 rapidly moves from the highest position of the cam 15 to the lowest position of the same so as to rapidly push up the stopping plate 8 to appear through the opening 21 of the draw-out portion 5', owing to the rotation of the cam 15 and the function of the spring 14.

As seen in FIG. 1, a transplanting rod assembly 22 rotates in a plane perpendicular to the feeding plane for the continuous paper tube potted seedlings 6-A. The rotary trace of the forward end of the rod assembly 22 is substantially in slidable contact with the plane of the draw-out portion 5'. Transplanting rods 22 are radially attached at their root portions to a pair of rotary discs 23, 23. A shaft 24 of the rotary discs 23, 23 is supported by the frame 1 and a sprocket 25 is fixed to the shaft 24. A chain 27 is provided between the sprocket 25 and another sprocket 26 fixed to the cam shaft 16. Thus, as the wheels 3, 3 rotate, the cam 15 and the transplanting rod assembly 22 are rotated in conjunction with the wheels 3, 3. In the transplanting rod assembly 22, as shown in FIG. 2, a shaft 28 is fixed between the pair of discs 23, 23 and a T-shaped attaching member 29 extending perpendicularly to the shaft 28 is fixed to the shaft 28. At the opposite sides of the T-shaped portion of the attaching member 29, a pair of pins 30, 30 are provided. A pair of arm rods 31, 31 are provided so that they may loosely pivot about the pins 30, 30 respectively. A pair of clasp rods 32, 32 are respectively fixed to the forward ends of the arm rods 31, 31. A pair of clasp plates 32', 32' fixed to the forward ends of the respective clasp rods, 32, 32 are outwardly urged by a spring 33 provided between the arm rods 31, 31. As shown in FIGS. 1 and 2, a pair of opening/closing actuating rods 34, 34 are provided downwardly from the position opposite to the stopping plate 8 along the rotary trace of the arm rods 31, 31 so as to inwardly press the respective arm rods 31, 31 so that the spacing therebetween is narrowed so as to be able to clasp one paper tube potted seedling 6-1. Thus, when the clasp rods 32, 32 have rotated to reach the opening/closing actuating rod 34, they clasp one paper tube potted seedling 6-1 which is stopped by the stopping plate 8, and when they have rotated to reach the lowered portion, they are caused to open the spacing therebetween owing to the function of the spring 33 so as to release the one paper tube potted seedling 6-1 into a groove formed in the ground by a grooving device 35. After releasing the one paper tube potted seedling 6-1, a pair of suppressing wheels 36, 36 advance succeeding the grooving device 35 to push soil back into the planted groove and press the soil. The reference numeral 37 denotes a handle for operating the transplanting machine.

In the transplanting machine arranged in the manner as described above according to the present invention, the stopping plate 8 may be actuated, alternatively, by a combination of a sensor and a solenoid, by another combination of a sensor and an oil pressure device, or by causing the forward end of the transplanting machine to abut the upper end of the stopping plate, in place of the cam 15. Further, the appearing/disappearing mechanism for the stopping plate 8 may be replaced by a right-left opening/closing mechanism as described later. An example of this right-left opening/closing mechanism will be described by referring to the drawings.

Figure 6:
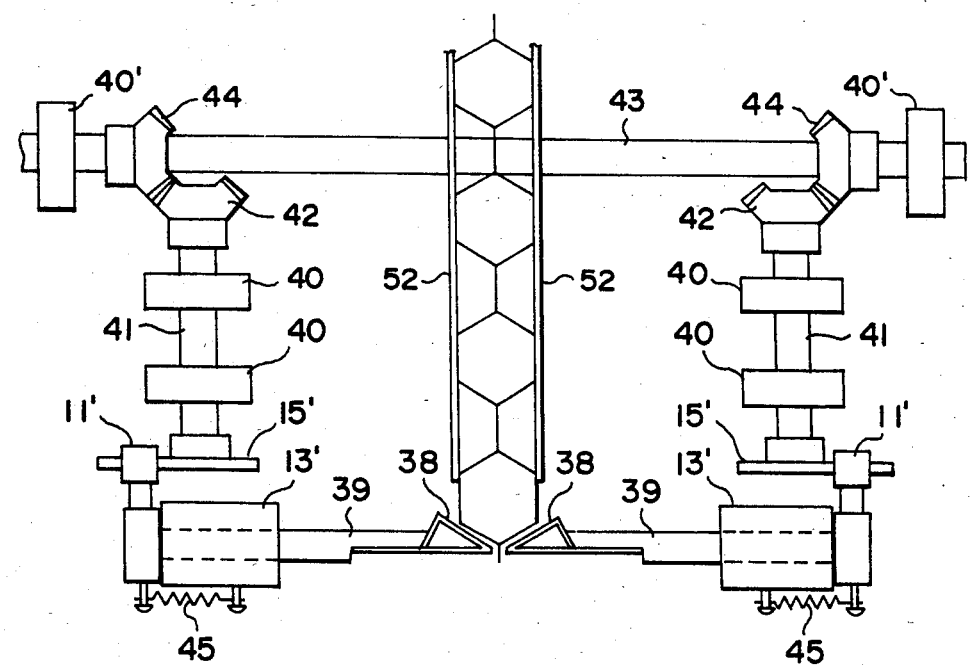
FIG. 6 is a plan view of another example of stopping plates.
Figure 7:
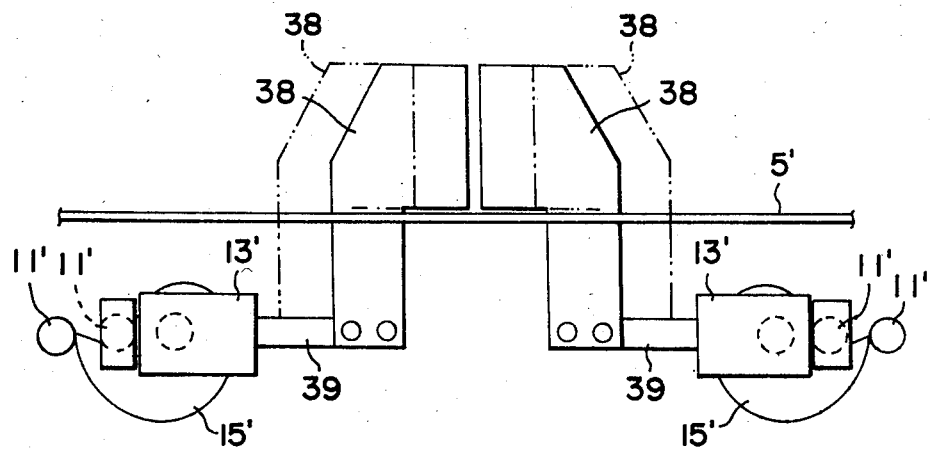
FIG. 7 is a front view of FIG. 6 embodiment.

As shown in FIGS. 6 and 7, a pair of right and left stopping plates 38, 38 are provided at the opposite sides of respective pressing plates 52, 52 and fixed to the forward ends of supporting rods 39, 39 respectively. The supporting rods 39, 39 are respectively supported by a pair of bearings 13', 13'fixed on the draw-out portion 5' of the seedling table 5 so that the supporting rods may leftwardly/rightwardly move. To the ends of the respective supporting rods 39, 39 a pair of rollers 11', 11' are loosely pivotally attached such that they respectively abut the cam surfaces of cams 15', 15' provided symmetrically to each other. Each of the cams 15', 15' is perpendicularly fixed on one end of a rotary shaft 41 supported by a pair of bearings 40, 40. A bevel gear 42 is fixed on the other end of each rotary shaft 41 and rotated in conjunction with the shaft 24 of the transplanting rod assembly 22 through a chain (not shown). Each of the bevel gears 42, 42 is geared with another bevel gear 44 fixed on a shaft 43 rotatably supported by a pair of bearings 40', 40'. A pair of draft springs 45, 45 is provided to connect the bearings 13', 13' to the respective supporting rods 39, 39.

Thus, the right and left stopping plates 38, 38 are rightwardly/leftwardly moved to open the gap therebetween as the shaft 43 rotates and then rapidly to close it owing to the drawing force of the respective springs 45, 45, because the cams 15', 15' are arranged symmetrically. The opening/closing operation of this arrangement may be substituted for the previously described appearing/disappearing operation of the stopping plate 8.

Further, the pressing plates 52, 52 always press the row of paper tube potted seedlings 6-A placed on the steep inclined plane of the seedling table 5, that is, on the seedling draw-out portion 5', from the opposite sides of the row 6-A so as to prevent natural fall of the row 6-A. If the pressing force of the pressing plates 52, 52 is too strong, the advancing of the row of paper tube potted seedlings 6-A, which advances along the draw-out portion 5' in conjunction with the rotation of the transplanting rod assembly 22, is interfered with resulting in a risk of breakage at the connecting portion of the row 6-A. However, if a guide roll is provided at the upper end portion of the draw-out portion 5', and if the pressing force of the pressing plates is released for a predetermined time in accordance with the rotation of the transplanting rod assembly 22, the advancing of the row of paper tube potted seedlings 6-A may be improved. An embodiment for attaining this feature will be described by reference to FIG. 9 et seq.

A pair of guide wheels 77, 77 is provided at an upper portion of a seedling draw-out portion 75a. The spacing between the wheels 77, 77 is selected to be wider than the width of a row of potted seedling 76-A which has been separated successively from the forwardmost row thereof from a snake-like connected continuous paper tube assembly of potted seedlings 76 on a seedling mount portion 75b of the seedling table. The guide wheels 77, 77 rotate in the direction to advance the potted seedling row by means of a rotating mechanism described below. Thus, the drawing-out of the potted seedling row 76-A is promoted without applying unnecessary resistance against the drawing-out operation.

Figure 12:
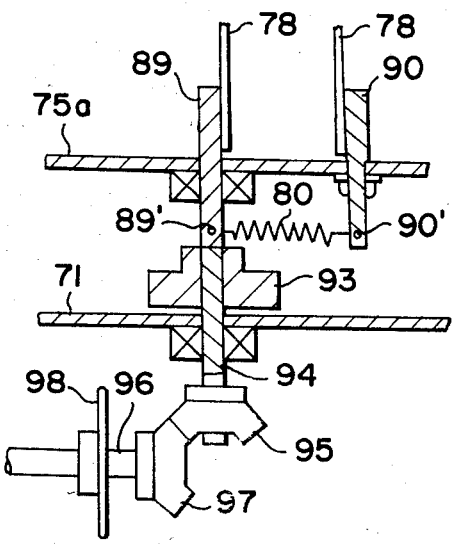
FIG. 12 is a transverse cross-sectional view of the pressing plates.

Following the guide wheels 77, 77, there are provided a pair of pressing plates 78, 78 having almost the same height as the potted seedling row 76-A on the draw-out portion. One of the plates 78, 78 is fixed on a shaft 89 which is rotated by the later-described means and passes through the seedling draw-out portion 75a, and the other plate is fixed to an attaching rod 90 fixed to the seedling draw-out portion 75a. The respective lower ends of the shaft 89 and the attaching rod 90 are connected to each other by a spring 80 (FIG. 12). Thus, the one pressing plate 78 attached to the shaft 89 swings by later-described means while the other pressing plate 78 attached to the attaching rod 90 is immovable, and the potted seedling row 76-A, which has been led by the guide wheels 77, 77 and which is normally pressed by the pressing plates 78, 78 owing to the function of the spring 80, is released from the pressing force as the shaft 89 rotates. A transplanting rod assembly 81 rotates in a plane perpendicular to the seedling draw-out portion 75a. When a clasp portion 81' of one transplanting rod 81 clasps a forward one paper tube 76-B$_1$ of the potted seedling row 76-A the forward end of which is stopped by a stopping plate 79, the pressing plate 78 which moves in conjunction with later-described means releases the pressing force and the stopping plate 79 comes down to the under side of the seedling draw-out portion 75a and the transplanting rods 81 clasping one paper tube 76-B$_1$ successively downwardly rotate. Thus, the row of continuously connected paper tube potted seedlings 76-A advances along the draw-out path.

Having advanced by the length of the forward one paper tube 76-B$_1$, the stopping plate 79 projects from the upper surface of the seedling draw-out portion 75a so as to impact against the forward end of the next one paper tube thereby to stop the advancing of the row of paper tube potted seedlings 76-A. At the same time the shaft 89 returns to its initial state so that the pressing plates 78 again press the row of paper tube potted seedlings 76-A from opposite sides thereof. In this manner, since the forwardmost paper tube 76-B$_1$ is brought down while being clasped by the transplanting rod 81, the connection portion thereof is broken and the potted seedling is planted at a given position in a groove formed in the field by later-described means. To this end, the transplanting rod 81, the stopping plate 79, the pressing plates 78 and the guide wheels 77 move in conjunction with each other.

A chain 86 is provided between a sprocket 85 fixedly provided on a shaft 73' of wheels 73, 73 and another sprocket 85' fixedly provided on a shaft 84 of a cam 83 provided on a frame 71. Another chain 88 is provided between the sprocket 85' provided on the cam shaft 84 of the cam 83 and a sprocket 87 provided on a shaft 82' of a transplanting rod attaching wheel 82. Thus the driving force of an engine 72 is transmitted to the transplanting rod attaching wheel 82 through chains 74, 86 and 88. The lower end of a slide rod 79' constituting the lower portion of the stopping plate 79 is in slidable contact with the surface of the cam 83, such that when the transplanting rod 81 has clasped the forwardmost paper tube 76-B₁, the stopping plate 79 is brought to the under side of the seedling draw-out portion 75a. When the row of paper tube potted seedlings 76-A has advanced by one paper tube, the stopping plate 79 projects from the upper surface of the seedling draw-out portion 75a.

Figure 11:
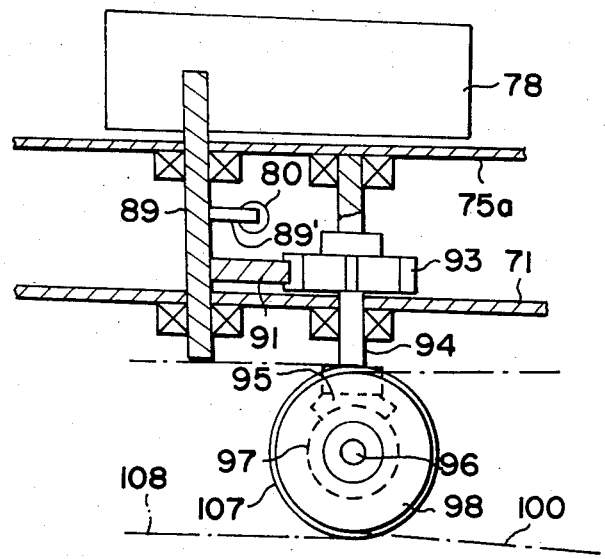
FIG. 11 is a detailed cross-sectional view of pressing plates.

The shaft 89 fixed to one of the pressing plates 78, 78 downwardly extends through the seedling draw-out portion 75a, while the attaching rod 90 of the other pressing plate 78 extending downwardly is fixed to the seedling draw-out portion 75a. Pins 89', 90' (FIG. 12) are perpendicularly fixed to the shaft 89 and the attaching rod 90 respectively, and spring 80 is provided between these pins 89', 90'. A lower portion of the shaft 89 perpendicularly projects to form an engaging pawl 91 which is in contact with a protrusion wheel 93 having protrusions corresponding in number to the transplanting rods 81 (FIG. 11). A shaft 94 is provided on the protrusion wheel 93 and the upper end of the shaft 94 is inserted into a bearing provided on the back surface of the seedling draw-out portion 75a. A bevel gear 95 provided at the lower end of the shaft 94 is geared with another bevel gear 97 provided at one end of a shaft 96 provided on the frame 71, so that the bevel gears 95, 97 move in conjunction with each other. The rotation of the shaft 96 is transmitted through a chain 100 provided between a sprocket 98 on the shaft 96 and another sprocket 99 provided on the cam shaft 84. The transplanting rods 81 are arranged to rotate at the same rotary speed as the protrusion wheel 93. The period of time of engagement between the engaging pawl 91 and one protrusion of the protrusion wheel 93 corresponds to the time required for the transplanting rod 81 to draw out one paper tube potted seedling. When the transplanting rod 81 has clapsed the forwardmost paper tube 76-B₁, the engaging pawl 91 and the protrusion wheel 93 engage with each other to cause the shaft 89 to rotate against the spring 80. This outwardly directs the lower portion of the one pressing plate 78 to release the pressing force on the potted seedling row 76-A to thereby allow the potted seedling row 76-A to advance without being subjected to pressing force by the pressing plates 78, as the transplanting rod 81 rotates downwards. Thereafter, when the potted seedling row 76-A has advanced by the width of one paper tube, the engaging pawl 91 and the portrusion wheel 93 disengage from each other and the pressing plate 78 is brought back to its initial positon by the spring 80, whereby the pressing plates 78 may press the potted seedling row 76-A and prevent the potted seedling row 76-A on the seedling draw-out portion 75a from falling down.

Figure 9:
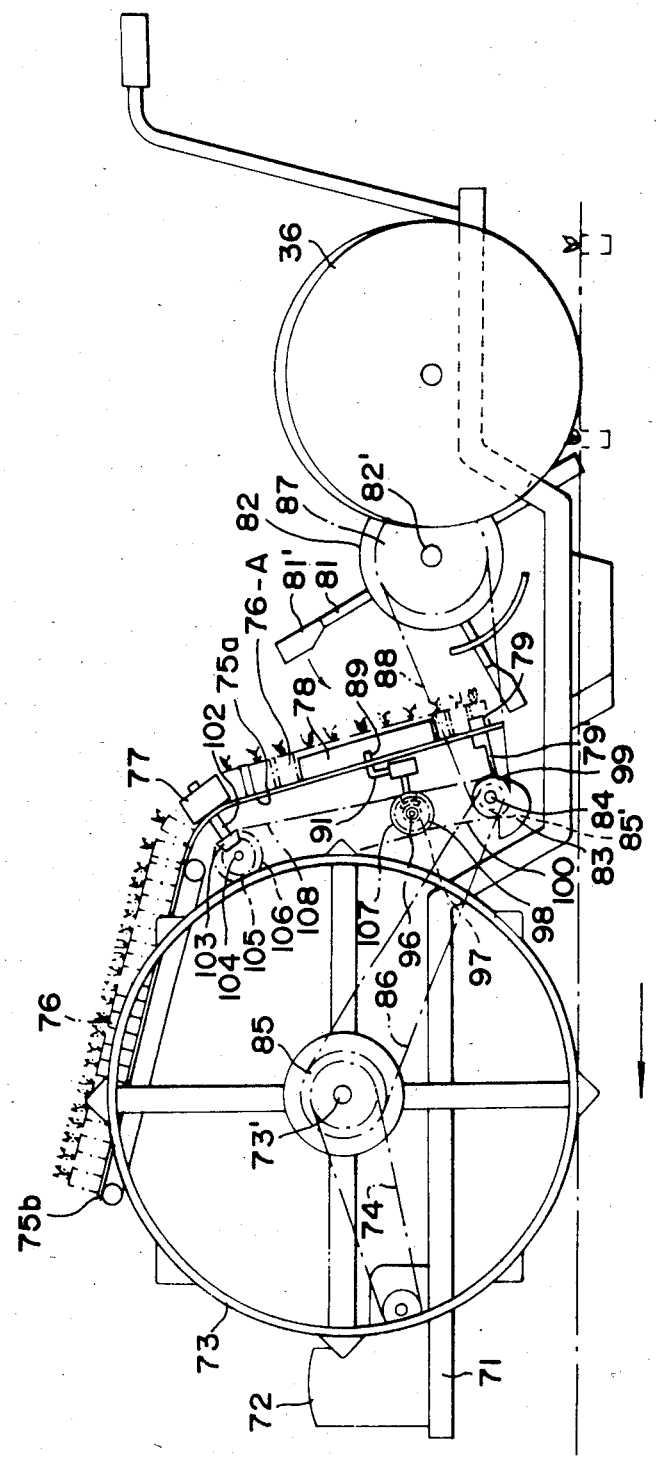
FIG. 9 is a side view showing another embodiment of the transplanting machine according to the present invention.
Figure 10:
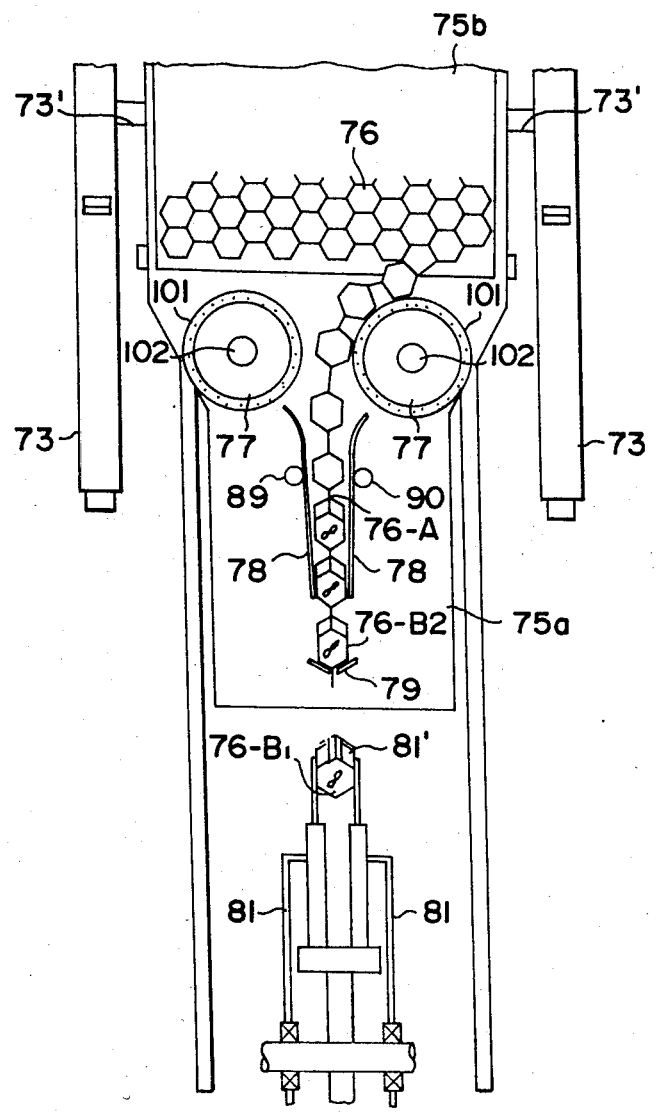
FIG. 10 is a plan view of the FIG. 9 embodiment.

As shown in FIG. 10, the circumference of each of the guide wheels 77, 77 provided at the upper portion of the seedling draw-out portion 75a is covered with a cushion material 101 such as sponge, soft gum, felt, or the like. Rotary shafts 102, 102 inserted at one end in the respective guide wheels 77, 77 extend through the forward position of the seedling table 75a, with their lower ends fixed to bevel gears 103, 103, respectively, as shown in FIG. 9.

The bevel gears 103, 103 are respectively geared with bevel gears 105, 105 fixed on a shaft 104 attached to the frame 71 and are rotated by means of a chain 108 provided between a sprocket 106 provided at one end of the shaft 104 and another sprocket 107 provided on the shaft 96. The rotary speed of the guide wheels 77, 77 is selected such that the circumferential speed is the same as the speed of drawing-out by the transplanting rod 81, so as to prevent the potted seedling row 76-A from being fed to the draw-out path faster than the drawing-out rate by the transplanting rod 81 and so as to remove the draw-out resistance during the drawing-out of seedlings. A belt conveyor provided on the potted seedling mount portion 75b may be driven by the wheel shaft 73' through a chain, or, alternatively, by the shaft 104 for driving the guide wheels 77 through a chain, and the driving is arranged such that the conveyor advances by one pitch as the forwardmost one row 76-A is drawn out from the continuous paper tube assembly of potted seedlings.

According to the present invention, in the arrangement as described above, when the engine 2 is driven in use, the wheels 3, 3 connected to the engine 2 rotate so as to cause the cam 15 and the transplanting rods 22 rotate.

In operation, the continuous paper tube assembly potted seedlings 6 are initially arranged such that the forwardmost row of them as drawn out of the assembly is clasped by the pressing plates 52, 52, with the forward end paper tube potted seedling 6-1 being registered with the projecting position of the stopping plate 8. When the transplanting rod assembly 22 begins to rotate, the forwardmost paper tube potted seedling 6-1 is clasped by the clasp plates 32', 32'. The operation of various members at this time will be described by referring to FIGS. 3 and 8. As the transplanting rod assembly 22 rotates, the gap between the clasp plates 32', 32' is wider than the width ($D_1$) of one paper tube pot before they come to the position (a) of FIG. 3 (FIG. 8a) so that the clasp plates 32', 32' do not impact against the row of continuous paper tube potted seedlings 6-A. When the transplanting rod assembly 22 further rotates to reach the point (b) of FIG. 3, the gap between the clasp plates 32', 32' is reduced to the width ($D_2$) so as to clasp the forwardmost paper tube potted seedling 6-1 (FIG. 8b) because the opening/closing rod 34 presses the arm rods 31, 31, whereby the forwardmost potted seedling 6-1 is clasped by the clasp plates 32', 32'. When the forwardmost potted seedling 6-1 clasped between the clasp plates 32', 32' has been drawn out by one pitch by the rotation of the transplanting rod assembly 22, the roller 11 provided at the root portion of the supporting rod 10 of the stopping plate 8 moves so as to cause the stopping plate 8 to move instantly to the projected position (the projected stopping plate 8 is shown by two-dots-chain line in FIG. 3) (FIG. 8c) of substantially the same height as the paper tube pot from the back side of the draw-out portion 5' of the seedling table 5, that is from the position (g) to the position (h).

At this time, since the stopping plate 8 is formed at its central portion with the slot 9 allowing the paper tube connection portion 7 to pass therethrough, the continuous paper tube potted seedlings 6-A advance between the pressing plates 52, 52 as the transplanting rod assembly 22 rotates and when the second paper tube potted seedling 6-2 next to the forwardmost one abuts the stopping plate 8, the row of continuous paper tube potted seedlings 6-A is stopped. Thus, the forwardmost paper tube potted seedling 6-1 clasped between the clasp plates 32', 32' is forcibly separated from the row 6-A at the connecting portion 7 in the position (c) of FIG. 3 (FIG. 8d) owing to the rotation of the transplating rod assembly 22. When the paper tube potted seedling 6-3 clasped between the clasp plates 32', 32' has reached the planting position (d) of FIG. 3 in the groove formed by the grooving device 35, the pressing force applied to the arm rods 31, 31 by the opening/closing actuating rods 34, 34 to narrow the gap between the clasp plates 32', 32' is released (FIG. 8e). Thus the gap between the clasp plates 32', 32' is widened by the spring 33 and the released paper tube potted seedling 6-3 is planted in the planting groove. During this operation, the stopping plate 8 successively moves downward to the under side of the seedling table 5 owing to the rotation of the cam 15, and is placed at the back side of the draw-out side 5' when the clasp plates 32', 32' of the next transplanting rod clasp the forwardmost paper tube potted seedling 6-1 of the potted seedling row 6-A to draw it out. Accordinly, there arises no interference for the clasp plates 32', 32' to draw-out the forwardmost paper tube potted seedling 6-1.

Thereafter, the above-described operations are repeated so that the continuous paper tube assembly potted seedling 6 are drawn-out as the transplanting rod assembly 22 rotates so that the paper tube potted seedlings are successively individually separated from the row to be successively planted. The row of paper tube potted seedlings 6-A is pressed by the pressing plates 52, 52 just upstream of the appearing/disappearing position of the stopping plate 8 with sufficient pressing force to prevent the row 6-A from spontaneously falling down, while allowing row 6-A to advance through the gap between the pressing plates 52, 52 to be drawn out without breaking the connecting portion 7. Further, if a mechanism is provided which releases the pressing force during the advancing of the row of continuous paper tube potted seedlings by one pitch through the gap between the pressing plates 78, 78 as shown in FIG. 9 et seq., and if a rotary roller 77, 77 provided on the seedling draw-out portion 75a is rotated in agreement with the advancing speed of the potted seedling row, the paper tube pot connecting portion cannot be broken even if the pressing force of the pressing plates is made stronger. Further, the length in the draw-out direction of the pressing plates at their portions abutting the paper tube potted seedling row is not required to be as long, and a length capable of pressing one to five paper tube pots of seedlings is sufficient.

The appearing/disappearing operation of the stopping plate 8 and the rotating operation of the transplanting rod assembly 22 are performed by linking, through the chain 27, the rotary shaft 16 of the cam 15 with the shaft 24 of the rotary wheel 25 to which the transplanting rod assembly 22 is fixed. The rotation ratio of the shaft 9 to the shaft 16 is previously determined by properly setting the number of teeth of the sprockets provided on the respective shafts 9 and 16 for providing a chain therebetween, depending on the number of transplanting rods 22 fixed to the rotary wheel 25. Thus the upward projection of the stopping plate 8 from the draw-out portion 5' of the seedling table 5 and the separation of the forwardmost paper tube pot 6-1 by the transplanting rod assembly 22 can be performed without any interference.

According to the present invention, as described above, the row of continuous paper tube potted seedlings 6-A is drawn out by the rotary force of the transplanting rod assembly 22 as the rod assembly rotates. The forwardmost potted seedling 6-1 is separated from the row 6-A by the same rotary force of the transplanting rod assembly 22 so that the separated potted seedling is then transplanted, and the same operation is repeated when the next transplanting rod comes to the position of the next forwardmost paper tube potted seedling 6-1. Further, since the forwardmost paper tube potted seedling of the potted seedling row is stopped at a predetermined position every time by the stopping plate, the forwardmost paper tube pot is always stopped by the stopping plate so that the position thereof is correct, even if there is a difference in the pitch of the respective paper tube pots. Accordingly, positional error is not accumulated so that the prior art defects, which have been a major drawback to mechanization of transplanting of paper tube potted seedlings (such as deformation of paper tube pots, difficulties of clasping by transplanting rod due to errors in pitch of paper tube pots, interruption of operation due to breakage of paper tube pots) may be successfully eliminated according to the present invention. Further, since a potted seedling is always restricted in the process from the drawing-out of the potted seedling to the planting of the same without allowing free movement, the accuracy in planting is very high in accordance with the accurate operation of the transplanting rod assembly, resulting in very accurate transplanting intervals.

Being provided with a slight separation causing portion and separation line in each connecting portion, a continous paper tube pot assembly may be used according to the present invention which is assembled with a plurality of serially connected paper tube pots each having a height relatively low with respect to the dimension of inlet opening of the same. This is because the forwardmost paper tube pot may be clasped and separated from the paper tube pot next to the forwardmost one, which is completely stopped by a stopping plate, by being broken at the connecting portion owing to the rotation of the transplanting assembly. Furthermore, with respect to the force required for pot separation, since the rotary force of the transplanting rod assembly is very strong, the pot separation can be easily performed regardless of the shape of each paper tube pot if a separation line has been provided in each connecting portion, whereby mechanical transplating can be automatically performed with a simple mechanism by using a continuous paper tube pot assembly.

What is claimed is:

1. A transplanting machine in which continuous paper tube pot assembly potted seedlings are drawn out in a row and the row of continous potted seedlings is separated into individual potted seedlings to be planted in a given field, said machine comprising:
    a stopper mechanism for intermittently stopping the drawing out of the row of continuous paper tube potted seedlings and
    a rotary transplating rod assembly having means for clasping a forwardmost one of the row of continuous paper tube potted seedlings, said rod assembly positively drawing out and separating a forwardmost potted seedling from said row in cooperation with said stopper mechanism to plant the separated potted seedling in the field.

2. A transplanting machine in which from a continuous paper tube pot assembly of potted seedlings a continuous row of potted seedlings is drawn out and is separated into individual potted seedlings to be planted in a given field, said machine comprising:
    a seedling table for mounting thereon the continuous paper tube pot assembly potted seedlings;
    guide means provided at a drawing-out portion which is a forward portion of said seedling table, for guiding the row of continuous paper tube potted seedlings;

a stopper mechanism provided at a forward end portion of said seedling table, for intermittently stopping the drawing-out of the row of continuous paper tube potted seedlings; and a rotary transplanting rod assembly having means for clasping a forwardmost one of the row of continuous paper tube potted seedlings, said rod assembly positively drawing-out the row of continuous paper tube potted seedlings to said stopper mechanism and said rod assembly rotating to then separate said forwardmost one potted seedling from said row in cooperation with said stopper mechanism and then to plant the separated potted seedling in the field.

3. A transplanting machine according to claim 2, in which said drawing out portion includes a downwardly inclined plane and said guide means includes a pair of pressing plates for pressing the row of continuous paper tube potted seedlings from both sides thereof.

4. A transplanting machine according to claim 2, in which said stopper mechanism includes stopping plate means arranged to move reciprocally between an open position and a closed position for stopping the drawing out of succeeding ones of the continuous paper tube potted seedlings by abutting the front surface of a succeeding one from next to the forwardmost one of the row of paper tube potted seedlings which is clasped by said stopping plate means.

5. A transplanting machine according to claim 4, in which said stopping plate means projects substantially to the same height as each of the continuous paper tube pots through an opening formed in an inclined plane of said drawing out portion to prevent passage of the row of paper tube potted seedlings, and in which said stopper mechanism further includes actuating means provided at a back side of said drawing out portion for reciprocally moving said stopping plate means from said open position to said closed position.

6. A transplanting machine according to claim 4, in which said stopping plate means includes a pair of stopping plates respectively provided at right and left sides on a top surface of an inclined plane of said drawing out portion, each stopping plate having substantially the same height as each of the continous paper tube pots, said stopping plates being supported movably between a first position at which said stopping plates form a first gap which is larger than the width of each of the continuous paper tube pots and a second position at which said stopping plates form a second gap which is smaller than said first gap and allows passage of each connecting portion of adjacent ones of the continuous paper tube pots but not passage of said pots, and in which said stopper mechanism further includes actuating means for actuating said stopping plates to move by an actuating rod connected to said stopping plates.

7. A transplanting machine according to claim 2, in which said rotary transplanting rod assembly includes a rotary wheel and at least one transplanting rod radially provided on said rotary wheel, said transplanting rod assembly functioning such that when said transplanting rod is rotated while facing an end portion of said drawing out portion it causes an actuating mechanism to actuate said stopper mechanism, and such that said transplanting rod clasps the forwardmost potted seedling at the drawing out portion, and places the forward surface of a succeeding paper tube potted seedling next to the forwardmost potted seedling clasped by said transplanting rod when the potted seedling row has been drawn out by one pitch, said actuated stopper mechanism stopping the advance of the potted seedling row thereby to separate the forwardmost paper tube potted seedling from the succeeding continuous paper tube potted seedlings by continuing the rotation of the transplanting rod while clasping the forwardmost potted seedling.

8. A transplanting machine according to claim 3, in which the pressing plates are so arranged that they release the pressing force applied by said pressing plates to the row of paper tube potted seedlings during the period that said transplanting rod assembly clasps the forwardmost one of the row of continuous paper tube potted seedlings between said pressing plates and draws out said row by one pitch.

9. A transplanting mechanism according to claim 2, in which said guide means includes at least one of a pair of idler rollers and a pair of forcibly driven rollers provided on said drawing-out portion at a portion above said pressing plates, a gap between said at least one pair of rollers being selected to be larger than a width of the row of continuous paper tube potted seedlings.

10. A transplanting machine according to claim 9, in which said forcibly driven rollers are arranged to rotate in such a direction as to draw out the row of continous paper tube potted seedlings at a peripheral speed substantially equivalent to a rotary speed of said transplanting rod assembly.

* * * * *